United States Patent
Jha et al.

(10) Patent No.: US 7,319,876 B2
(45) Date of Patent: Jan. 15, 2008

(54) SYSTEM AND METHOD FOR USING EQUIPMENT IDENTITY INFORMATION IN PROVIDING LOCATION SERVICES TO A WIRELESS COMMUNICATION DEVICE

(76) Inventors: Anjali Jha, 415 Stoney Point Way, #104, Oceanside, CA (US) 92054; Francesco Grilli, 5350 Toscana Way, #402, San Diego, CA (US) 92122

( * ) Notice: Subject to any disclaimer, the term of this patent is extended or adjusted under 35 U.S.C. 154(b) by 125 days.

(21) Appl. No.: 10/648,623

(22) Filed: Aug. 25, 2003

(65) Prior Publication Data
US 2004/0138807 A1 Jul. 15, 2004

Related U.S. Application Data

(60) Provisional application No. 60/406,261, filed on Aug. 26, 2002.

(51) Int. Cl.
*H04Q 7/20* (2006.01)
*H04M 11/04* (2006.01)

(52) U.S. Cl. .............................. 455/456.2; 455/456.1; 455/456.3; 455/456.5; 455/456.6; 455/433; 455/404.2

(58) Field of Classification Search ............. 455/456, 455/456.1–456.6, 457, 461, 466, 558, 514–519, 455/550.1, 554.2, 556.2, 2.01, 403, 404.2, 455/410–411, 412.1, 415–417, 422.1, 423–425, 455/432.3, 435.1, 433–434; 370/313, 332–333, 370/349–350; 709/203, 219, 228–229; 340/5.1–5.25, 340/5.65, 5.7, 5.74, 5.8–5.86; 701/200–217
See application file for complete search history.

(56) References Cited

U.S. PATENT DOCUMENTS 4,751,512 A * 6/1988 Longaker ............... 342/357.03

(Continued)

FOREIGN PATENT DOCUMENTS

EP 1209933 5/2002

(Continued)

OTHER PUBLICATIONS

JP 2001016201, "Portable Terminal, Information Transmitter, Server Unit, Information Distribution System and it's Control Method", NTT Docomo, Jun. 30, 1999.

(Continued)

*Primary Examiner*—Meless Zewdu
(74) *Attorney, Agent, or Firm*—Thomas Rouse; Bruce Greenhaus; Andrea Mays

(57) ABSTRACT

A system, apparatus, and method provides location services to a mobile station by employing equipment identity information. In one aspect of the present inventive concept, a location server uses the equipment identity information of a mobile station in order to select the best protocol for LCS communication. In another aspect of the inventive concept, a mobile station uses the equipment identity information of a location server to select the best protocol to use for LCS communication. Advantageously, the equipment identity information can be used to correct manufacturing defects, fix design flaws and software bugs, track performance, optimize performance, or any combinations thereof. Information about features and defects relating to equipment identity information may be determined and stored for future use.

29 Claims, 13 Drawing Sheets

U.S. PATENT DOCUMENTS

| | | | |
|---|---|---|---|
| 5,950,125 A | 9/1999 | Buhrmann et al. | 455/422 |
| 6,070,083 A * | 5/2000 | Watters et al. | 455/517 |
| 6,081,712 A * | 6/2000 | Buettner | 455/433 |
| 6,131,067 A | 10/2000 | Girerd et al. | 701/213 |
| 6,157,925 A | 12/2000 | Jenkins et al. | 707/10 |
| 6,219,557 B1 * | 4/2001 | Havinis | 455/456.4 |
| 6,377,810 B1 * | 4/2002 | Geiger et al. | 455/456.2 |
| 6,400,956 B1 | 6/2002 | Richton | 455/456 |
| 6,650,902 B1 * | 11/2003 | Richton | 455/456.3 |
| 6,731,941 B2 * | 5/2004 | Kim | 455/456.2 |
| 6,771,950 B1 * | 8/2004 | Shupe et al. | 455/414.1 |
| 6,799,049 B1 * | 9/2004 | Zellner et al. | 455/456.1 |
| 6,810,257 B1 * | 10/2004 | Amin | 455/445 |
| 6,853,848 B2 * | 2/2005 | Sahinoglu | 455/456.1 |
| 6,912,395 B2 * | 6/2005 | Benes et al. | 455/456.1 |
| 2003/0186710 A1 * | 10/2003 | Muhonen et al. | 455/456.5 |
| 2005/0014500 A1 * | 1/2005 | Muhonen et al. | 455/433 |

FOREIGN PATENT DOCUMENTS

WO    0115480    3/2001

OTHER PUBLICATIONS

U.S. Appl. No. 2002/0080968, Olsson, Secure Location Based Services System and Method, Jun. 27, 2002.

* cited by examiner

SYSTEM AND METHOD FOR USING EQUIPMENT IDENTITY INFORMATION IN PROVIDING LOCATION SERVICES TO A WIRELESS COMMUNICATION DEVICE

CROSS-REFERENCE TO PENDING PROVISIONAL APPLICATION

This application claims priority under 35 USC 119 to U.S. Provisional Application No. 60/406,261, filed Aug. 26, 2002 and entitled "System and method for using local equipment identity information in providing location services to a wireless communication device."

BACKGROUND

1. Field

This invention relates to the field of location services for use in mobile devices or mobile stations, and more particularly to use of location services equipment identity information in providing location services in a wireless communication system.

2. Description of Related Art

Location services (abbreviated as LCS, for "LoCation Services") for mobile telephones and wireless digital communication devices (collectively referred to hereinafter as Mobile Stations) are an increasingly important business area for wireless communication providers. Location information can be used to provide a variety of location services to mobile station users. For example, public safety authorities can use location information to pinpoint the location of a wireless device. Alternatively, a mobile station user can use location information to find the location of the nearest automatic teller machine, as well as the fee charged by the ATM. As another example, location information can assist a traveler in obtaining step-by-step directions to a desired destination while en route.

Technologies that permit a large number of system users to share a communication system, such as Code Division Multiple Access (CDMA) and Wideband CDMA (WCDMA) technology, play an important role in meeting the ever-increasing demands of mobile computing, including the demands for location services. As is well known, CDMA and WCDMA communication devices are assigned a unique code and each mobile device uses its code to spread its communication signals across a common spread-spectrum bandwidth. As long as each communication device uses its correct code, it can successfully detect and select a desired signal from among other signals concurrently transmitted over the same bandwidth.

Other multiple mobile station signal access techniques include time division multiple access (TDMA) and frequency division multiple access (FDMA). There are also analog frequency modulation (FM) based wireless communication systems, such as the well known Advanced Mobile Phone System (AMPS). In addition, many wireless communication devices combine communications capabilities with global position system (GPS) techniques. Some wireless communication systems are capable of operating using multiple techniques, such as CDMA and GPS, or on different frequency bands, such as cellular or Personal Communication Services (PCS) bands. For example, the Global System for Mobile Communications (GSM) uses a combination of TDMA and FDMA technology. GSM systems also frequently employ General Packet Radio Service (GPRS) technology to transmit data and to provide location services.

Standards and functional specifications for LCS in wireless communication systems have been established. One exemplary reference relating to GSM and LCS is the 3rd Generation Partnership Project (3GPP), Technical Specification Group (TSG) Services and System Aspects, Technical Specification Group GSM/EDGE Radio Access Network, Functional stage 2 description of Location Services (LCS) in GERAN, (3GPP TS 43.059). Another exemplary reference is 3rd Generation Partnership Project, Technical Specification Group Radio Access Network, Stage 2 functional specification of User Equipment (UE) positioning in UTRAN, (3GPP TS 25.305). These technical specification documents are hereby fully incorporated by reference herein as though set forth in full, for teachings relating to mobile station location services. The incorporated references are referred to hereinafter as 3GPP TS 43.059 and 3GPP TS 25.305, respectively.

In typical use, and as set forth in greater detail in the incorporated 3GPP TS 43.059 reference, a mobile station (MS), which may comprise a mobile phone, a laptop, palmtop, or other conventional mobile device, or combination thereof, establishes a communication link with a base station system (BSS). A BSS typically includes a plurality of base station transceiver systems (BTSs) and a base station controller (BSC). A location server, such as a Serving Mobile Location Center (SMLC) (in a GSM system), provides location services to the MS as needed, such as coordinating the exchange of information from which the location of the MS can be determined. The location server may be part of a BSS, or it may be a separate server coupled to either a sole BSS or a system of BSSs.

Any given MS may comply with various international equipment standards, and may have accurate standard performance data available. In addition, any given communication system, such as one conforming to a current GSM specification, may not have adopted known equipment standards. In addition, any given MS may also have known manufacturing defects. An MS may be assigned an identification code, such as, for example, an "International Mobile Equipment Identifier" (IMEI) used in GSM systems and WCDMA systems, or an "Electronic Serial Number" (ESN), used in IS-95 and CDMA2000 systems.

A communication system may also maintain a database on an equipment identification server (EIS), such as an equipment identity register (EIR) in a GSM system, correlating users with particular equipment. An EIS may be incorporated into other parts of a communication system, such as a mobile switching center (MSC) or a gateway switching server (GSS). Such a database may have a unique code assigned to the user or to the equipment. The particular equipment properties and method location services operation of an MS can have a significant impact on the ability of a location server to efficiently and accurately provide LCS capabilities.

Another aspect of LCS relates to the use of an MS in geographical areas in which communication service provider networks employ different manufacturer models of location server equipment. Different location servers models interact with the MS according to the particular design characteristics of both the MS equipment and the location server equipment. For a given combination of MS equipment and location server equipment, there is a preferred set of messages and communication protocols that will enable determination of the MS location with optimal efficiency. By reading the Location Area Identifier (LAI), which is transmitted on the common channels, the MS can determine, using database information, which model of position location server is used in that particular network. Similarly, the MS can also determine the Operator Identification (ID) based upon broadcast information. The Operator ID can be related through database information to the position location server equipment.

In light of the foregoing, persons skilled in the wireless communications art shall recognize that significant improvements in providing LCS can be achieved by improving the messages exchanged between the MS and the location server. This can be advantageously accomplished by an inventive system, method and apparatus wherein the location server and the MS, either or both, obtain and use the LCS equipment identification information when providing LCS services.

SUMMARY

The system, apparatus, and method described herein are directed to the use of LCS equipment identification information in providing location services to a wireless communication device.

In one aspect of the present inventive concept, the location server uses the equipment identity information of an MS in order to select the best protocol for LCS communication. Advantageously, the MS equipment identity information can be used to correct manufacturing defects, fix design flaws and software bugs, track performance, optimize performance, or any combinations thereof. Methods based on equipment identity information may be employed to detect whether a mobile station works correctly, and to generate location services control signals to correct or minimize MS faults. For example, the location server may detect or determine from stored equipment identity information whether an MS performs according to a requested Quality of Service (QoS) requirement such as location accuracy, speed of performing location determination, etc. Based on this determination, the location server may optionally generate control signals, use additional information, or employ alternative methods to provide the requested QoS.

In another aspect of the inventive concept, the MS uses the equipment identity information of the location server to select the best protocol to use for LCS communication. For example, based on the model of position location server, the MS can use a preferred set of message parameters to optimize the efficiency of determining the MS location. If the position location server is known to have design defects or "bugs", the MS can act accordingly in order to avoid triggering these "bugs". During the process, the MS can obtain information about features and bugs of a particular position location server and store this information for future use.

In yet another aspect of the inventive concept, a location services apparatus for providing location services to a mobile station includes a Central Processing Unit (CPU), a memory coupled to the CPU, and an equipment identity processor coupled to the CPU and the memory. The memory stores data relating location services equipment identity to location services equipment identifiers. The equipment identity processor is adapted for receiving location services equipment identifiers, retrieving location services equipment identity data from the memory, and generating location services control signals to control operation of the CPU responsive to an identified location services related characteristic of the location services equipment, wherein the location services equipment include either a location server or a mobile station.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

The system, apparatus, and method described herein are directed to the use of mobile equipment identity information to facilitate providing location services to a wireless communication device. A mobile wireless communication device is referred to herein as a mobile station (MS), and may comprise a mobile phone, a laptop computer, a handheld computer, or any other mobile device that may be configured for wireless communication, or any combination thereof. As noted above, a number of different standards exist that govern wireless data communication. These standards may be implemented in a number of different ways to provide flexibility to the designer. The teachings herein are not limited to any specific standard.

Figure 1:
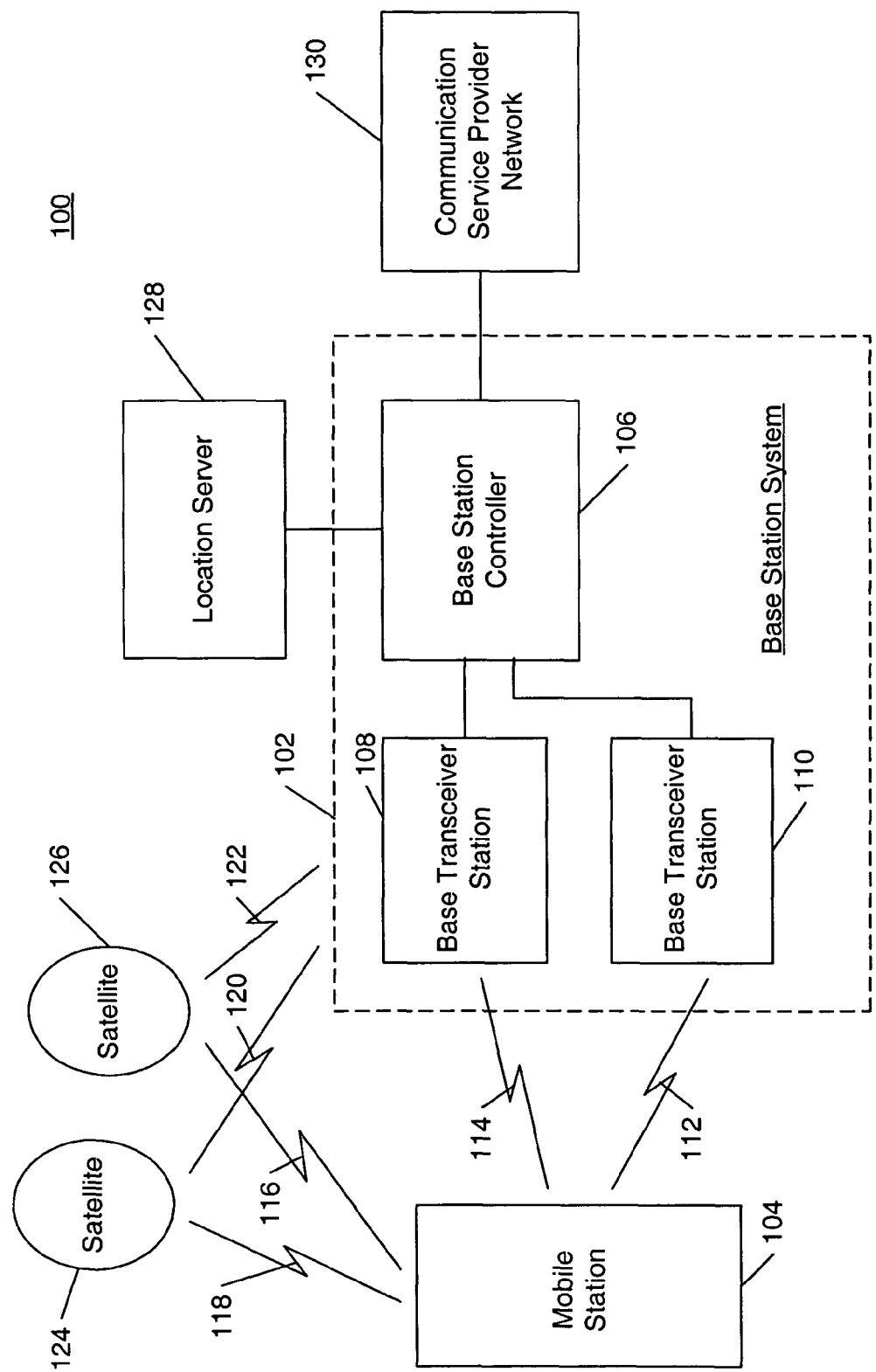
FIG. 1 is a functional block diagram of a wireless communication system for providing wireless communications including location services.

FIG. 1 illustrates a simplified general wireless communication system 100 that supports a communication link employing location services. As shown in FIG. 1, an MS 104 communicates with a Base Station System (BSS) 102 via one or more wireless links 112 and 114 to one or more Base Transceiver Stations (BTSs) 108 and 110. Although two BTSs are illustrated by way of example, location services may be provided to the MS 104 using only one BTS, or using a plurality of BTSs. The BTSs are operatively coupled for data communication to a Base Station Controller (BSC) 106, which is, in turn, connected to a location server 128 and a communication service provider network 130. The MS 104 may also receive signals, such as GPS signals, from one or more satellites 124 and 126 via communication links 116 and 118. The BSS 102 may optionally receive signals, such as GPS signals, from one or more satellites 124 and 126 via communication links 120 and 122. The location server 128 may also access the data transmitted by the satellites by means other than via the BTS/BSS. For example, a Wide Area Reference Network of satellite receivers, not shown in the drawings, could provide the satellite data to the location server. Although two satellites are illustrated by way of example, only one satellite, or a plurality of satellites, or none (e.g., if a triangulation technique such as Enhanced Observed Time Difference (E-OTD) is used) may be employed when providing location services to a mobile station.

When location services are required for the MS 104, information from the MS 104 and the BSS 102 may be provided to a location server 128. This information may include the locations of the BTSs 108 and 110, and information regarding signals received by the MS 104 and the BSS 102 from the satellites 124 and 126. The location server 128 uses this information to provide location services to the MS 104. The location server 128 may also provide information via the BSS 102 to the MS 104 to assist or improve determination of the location of the MS 104. The location server 128 may comprise a separate server, or alternatively, it may be incorporated into the BSS 102, or a control system located in the communication service provider network 130, or in some combination thereof. The communication connections illustrated may be wired (such as "POTS" or optical fiber), wireless, or a combination of wired and wireless connections.

Figure 2:
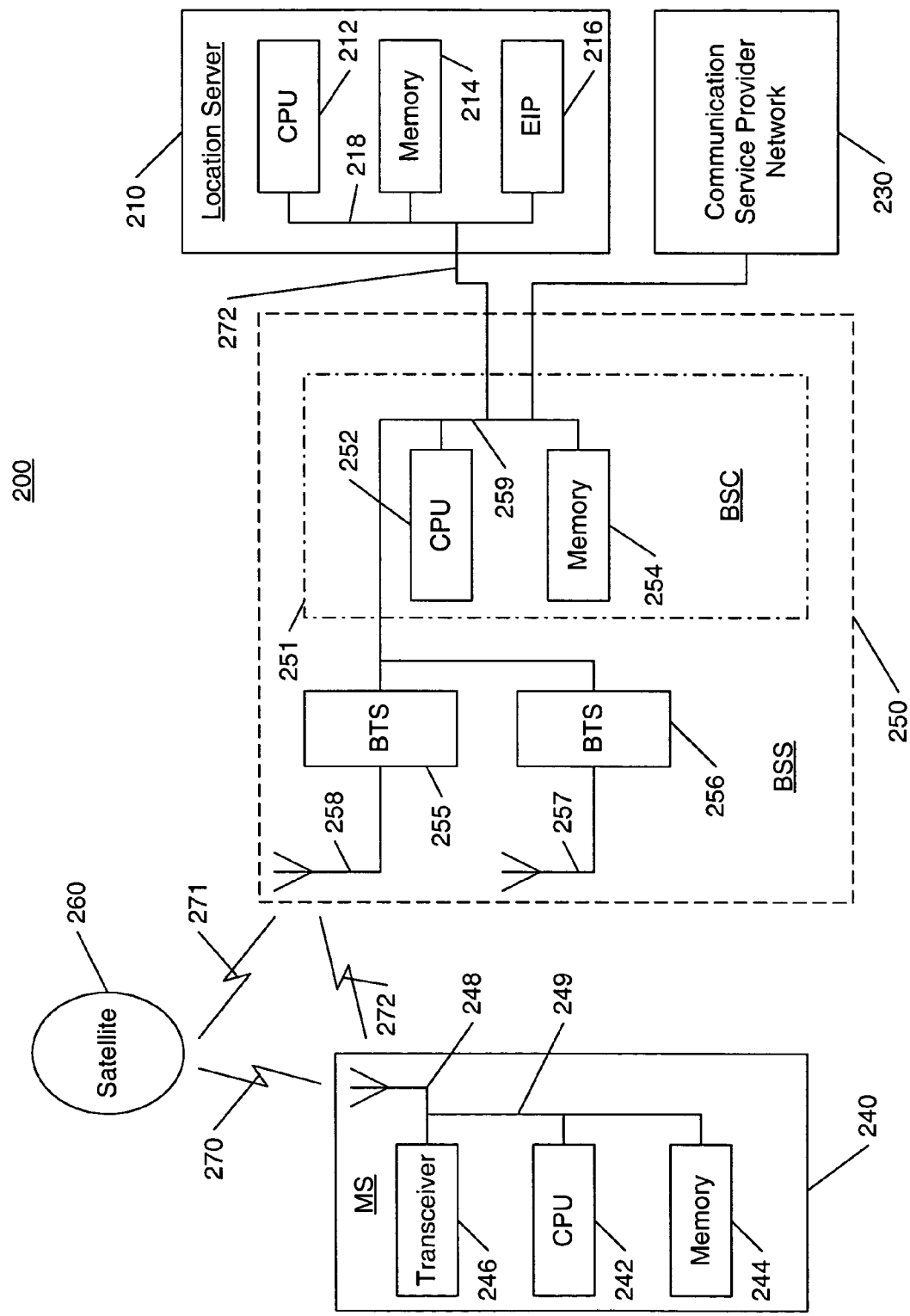
FIG. 2 is another functional block diagram of a wireless communication system for providing wireless communications including location services, showing additional elements.

FIG. 2 shows a communication system 200 in functional block form. The system 200 includes a location server 210 having a memory 214, and a central processing unit (CPU) 212 that controls operation of the location server 210. The term "CPU", as used throughout this description, is intended to encompass any processing device, alone or in combination with other devices (such as a memory), that is capable of controlling operation of a device (such as a location server 210, an MS 240, a BSS 250, or a portion thereof) in which it is included. For example, a CPU can include microprocessors, embedded controllers, application specific integrated circuits (ASICs), digital signal processors (DSPs), state machines, dedicated discrete hardware, and the like. The system, apparatus, and method described herein are not limited by the specific hardware component selected to implement the CPU 212. Moreover, the location server 210 may be incorporated into other components of a communication system (such as a BSS, a communication service provider network 230, a mobile switching center (MSC) in a GSM system, a satellite, or some combination thereof). The location server 210 may provide location services to multiple devices (such as the MS 240) communicating through multiple base station systems, such as the BSS 250.

The memory 214, which may include both read-only memory (ROM) and/or random-access memories (RAM), stores and provides instructions and data to the CPU 212. A portion of the memory 214 may also include non-volatile random-access memory.

The location server 210 also includes an equipment identity processor (EIP) 216. Typically, the CPU 212 implements the EIP 216 by executing a specific set of instructions stored in the memory 214, although in some embodiments a separate dedicated processor may be used to implement the EIP 216. The CPU 212 can execute instructions stored in the memory 214. The components of the location server 210 are linked together by a bus system 218.

The MS 240 has a CPU 242, a memory 244 and a transceiver 246 to allow transmission and reception of data, such as audio/video/text communication and programming data, between the MS 240 and a remote location, such as the BSS 250, or the satellite 260. An antenna 248 is electrically coupled to the transceiver 246. The MS 240 includes a bus system 249. The basic operation of the MS 240 is well-known in the art and need not be described herein. The MS 240 may use the memory 244 to store an IMEI or other identity information pertaining to the MS 240 and may transmit the information to the BSS 250. In accordance with GSM standards and technologies, the MS 240 may also include a Subscriber Identity Module (SIM, not shown) which stores an International Mobile Subscriber Identity (IMSI) and a secret key together with other subscriber specific information such as preferences, settings, and personal phone books.

The BSS 250 includes a BSC 251 including a CPU 252 and a memory 254, and BTSs 255 and 256. The BTSs allow transmission and reception of data (such as audio/video/text communication and programming data) between the BSS 250 and a remote location (such as the MS 240 or a satellite 260). Antennas 258 and 257 are electrically coupled to the BTSs 255 and 257, respectively. The BSC 251 has a bus system 259. The basic operation of the BSS 250 is well-known in the art and need not be described herein. As described above, the system and method described herein are not limited by the specific hardware component selected to implement the CPU 252 or other elements of the BSS 250.

The location server 210, the MS 240, the BSS 250 and the satellite 260 communicate via communication links 270, 271, and 272. Although one satellite is illustrated by way of example, persons skilled in the art will understand that a plurality of satellites may be employed, or none. As previously noted, the communication link 271 is optional, since other means for receiving the satellite data (e.g., a Wide Area Reference Network, not shown) may be employed. The BSS 250 provides any equipment identifying information received from the MS 240 via the communication link 273 to the location server 210, either directly or after processing. As is described in more detail below, the location server 210 may use the EIP 216 to process information regarding the identity of the MS 240 (for example, a unique equipment identifier such as an IMEI) and to generate control signals to control operation of the location request service provided for the MS, responsive to the equipment identity information.

The location server 210, the MS 240, the BSS 250 and the satellite 260 may comprise other components, such as power supplies (not shown), input/output devices (not shown), and additional CPUs and buses. These components can be arranged in various configurations. The system and method described herein are not limited to the specific configuration and arrangement of components shown.

Figure 3:
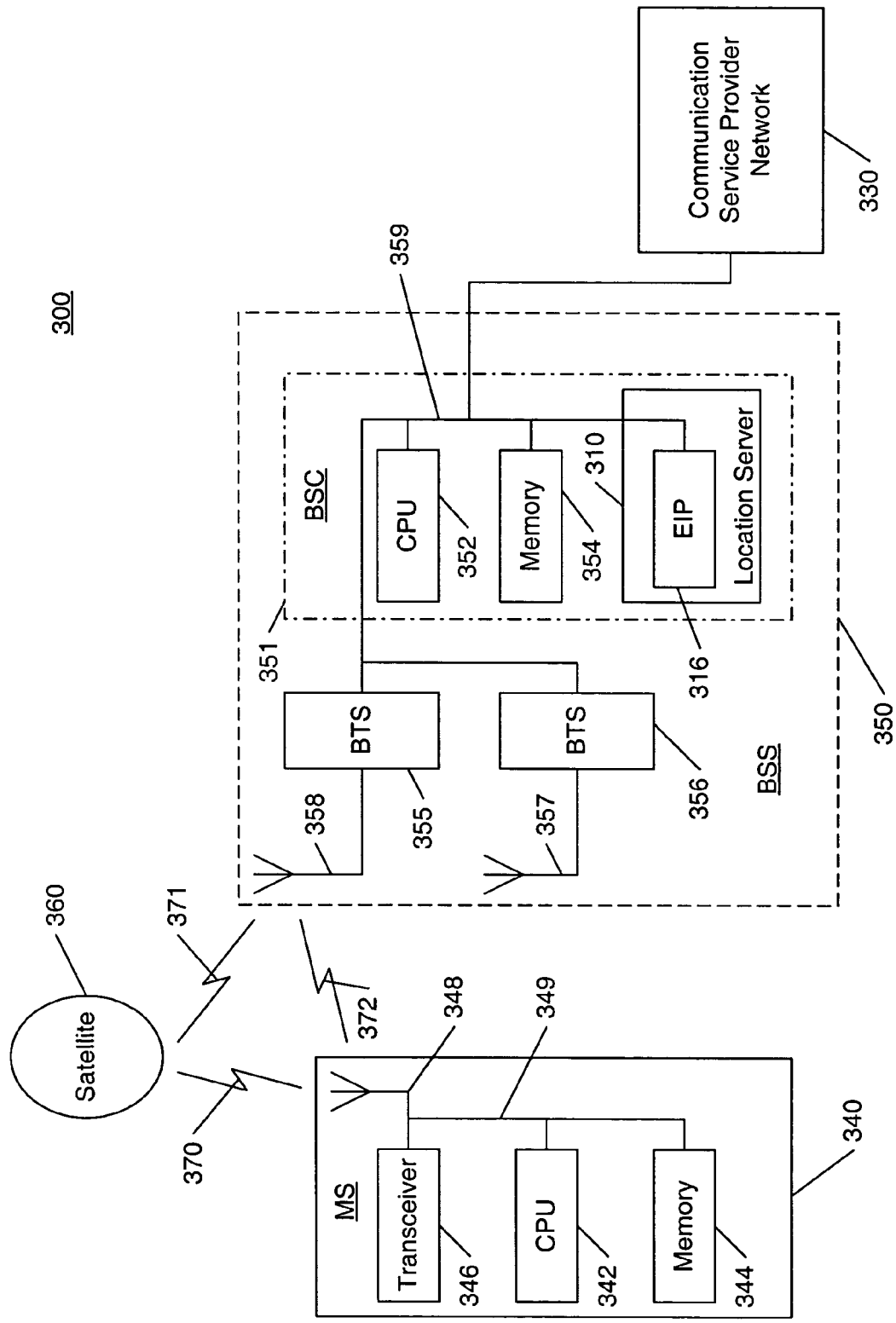
FIG. 3 is another functional block diagram of a wireless communication system for providing wireless communications including location services, showing an alternative configuration of elements.

FIG. 3 illustrates an alternative communication system 300 that provides location services to an MS. This system is similar in many ways to the communication system 200 illustrated in FIG. 2. The location server 310 is shown in FIG. 3 as part of the BSC 351 included in the BSS 350. The location server 310 includes an EIP 316. The BSC 351 also contains a CPU 352, a memory 354, and a bus system 359. The BSS 350 also includes BTSs 355 and 356, and respective antennas 358 and 357. Typically, the CPU 352 implements the location server 310 by executing a specific set of instructions stored in the memory 354. However, in some embodiments, a separate dedicated processor may form the location server 310. The location server 310 and the EIP 316 determine the services that the MS 340 requires for location determination, and instruct the CPU to provide the support services required by the MS 340. The BSS 350 (and BSC 351) are connected for data communication with a communication service provider network 330.

The MS 340 includes a CPU 342, a memory 344, a transceiver 346, a bus system 349, and an antenna 348. The system 300 includes a satellite 360. As noted above, location systems may employ a plurality of satellites, or none. The various parts of the communication system 300 communicate using communication links 370, 371, and 372. As previously noted, the communication link 371 is optional, since other means for receiving the satellite data (e.g., a Wide Area Reference Network, not shown) may be employed. As is described in more detail below, the location server 310 may use the EIP 316 to process identity information received from the MS 340 for the purpose of generating control signals that implement location services for the MS 340.

Figure 4:
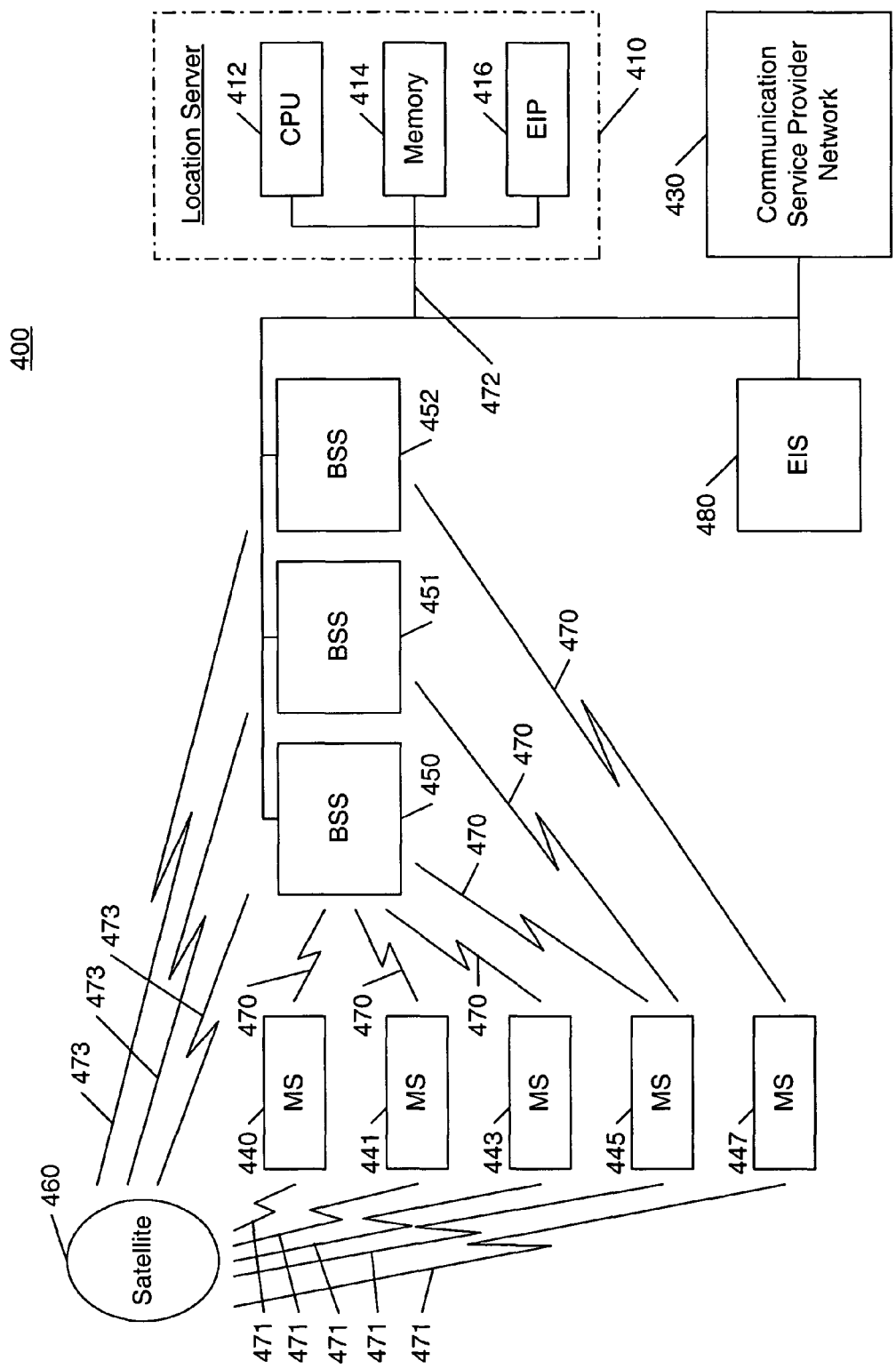
FIG. 4 is another functional block diagram of a wireless communication system for providing wireless communications including location services, showing a plurality of mobile stations.

FIG. 4 illustrates a communication system 400 wherein a location server 410 provides location services for a plurality of MS devices 440, 441, 443, 445, and 447, in communication with a plurality of BSSs 450, 451, and 452 via communication links 470. At any given time a single BSS communicates with a plurality of MSs, although the BSS may also use a plurality of BTSs not shown. However, as illustrated, at other times and under some circumstances, a plurality of BSSs may communicate with a single MS. The location server 410 communicates with the BSSs 450, 451, and 452 via the communication link 472. The MS devices 440, 441, 443, 445, and 447 and the BSSs 450, 451, and 453 may also communicate with a satellite 460 via communication links 471 and 473, respectively. As previously noted, the communication links 473 are optional, since other means for receiving the satellite data (e.g., a Wide Area Reference Network, not shown) may be employed.

The system 400 shown in FIG. 4 also includes an EIS 480 (in some embodiments, the EIS comprises an EIR, such as in a GSM system). The EIS 480 maintains a database correlating user and equipment information. For example, unique equipment identifiers, such as IMEIs, are correlated with individual subscribers (identified, for example, via IMSIs or Electronic Serial Numbers). The EIS 480 communicates with the location server 410 through communication link 472. In some embodiments, the EIS 480 may be part of, or connected through, an MSC (not shown), a BSS (450, 451, 452), a communication service provider network 430, or other control equipment.

The location server 410 has a CPU 412, a memory 414, an EIP 416, and a bus system 418. As will be described in more detail below, the location server 410 may use the EIP 416 to process information regarding the identity of the MSs and to generate control signals that control the location server 410. A request for location services as received by the location server 410, may include equipment information, or user identifier information, or both, as part of the request.

An EIP, such as the EIP 416 shown in FIG. 4, may use information about the identity of an MS, such as the MS 440 shown in FIG. 4, to generate control signals that control a location server, such as the location server 410, in a variety of different ways. For purposes of brevity, the operation of an EIP to control operation of a location server is illustrated below using a limited number of examples, with reference to components shown in FIG. 4.

Figure 5:
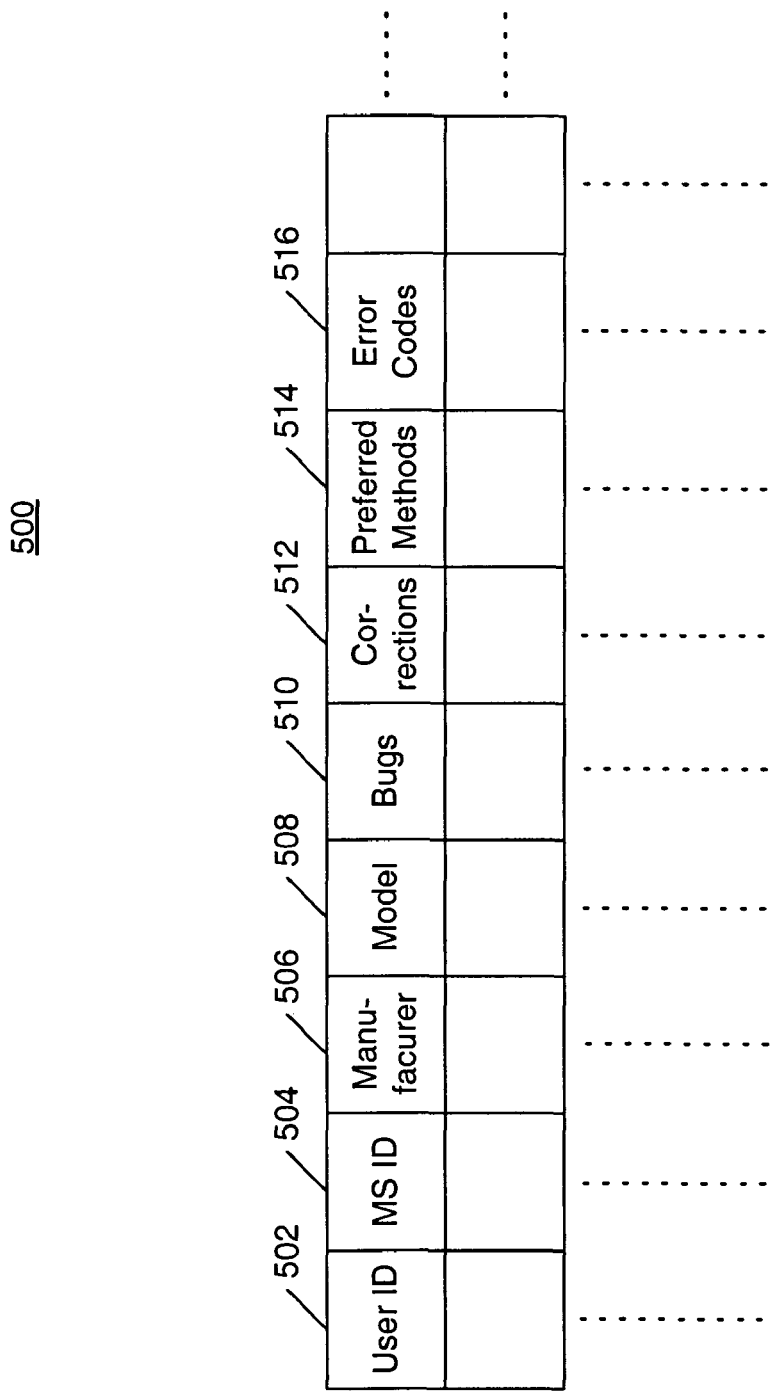
FIG. 5 is a schematic illustration of an exemplary database of equipment information illustrated in tabular form that may be maintained by an embodiment of the wireless communications system.

An EIP, such as the EIP 416, may maintain a database, for example a relational database, that maps equipment information and equipment characteristics for communication sessions with various devices, such as the MS 440. For example, unique equipment identifiers may include IMEIs or other standard identifiers associated with the equipment or equipment type. Equipment characteristics may include a manufacturer, a model, bugs, errors, preferred methods, etc., associated with the equipment or the equipment type, and relating to location services properties of the equipment. Such equipment characteristics may also be referred to herein as location services characteristics of the equipment. The database may be stored in the memory 414 in one embodiment. The database may be updated for every request for location services information that is received by the location server 410 or it may be updated for only some requests, for example, to take a statistical sampling. It may also be updated to delete obsolete information. FIG. 5 illustrates an exemplary database in the form of a table 500 that may be maintained by an EIP.

In the embodiment shown in FIG. 5, the table 500 contains: a field 502 for storing mobile subscriber identity information, such as an International Mobile Subscriber Identity (IMSI) in a GSM/GPRS/WCDMA communication system or an Electronic Serial Number (ESN) in an IS-95 and CDMA 2000 system; a field 504 for storing a mobile equipment identifier such as an IMEI in a GSM communication system; a field 506 for storing an equipment manufacturer identifier; a field 508 for storing a model identifier; a field 510 for storing known bug codes associated with the particular manufacturer and/or model; a field 512 for storing correction codes; a field 514 for storing a code identifying a preferred method of providing location services; and a field 516 for storing error codes. Table 500 may contain additional fields and may refer to other databases or tables, or it may not contain all of the fields described herein. For example, a separate database containing the bug codes and corresponding correction codes may exist, in which case the table 500 might contain the field 510 for storing the bug code. In this embodiment, in operation, the location server 410 would look up the corresponding correction code in another database or table, rather than storing it in the field 512. Separate databases may be maintained by other servers, such as the EIS 480 and information retrieved by the location server 410 as needed.

Figure 6:
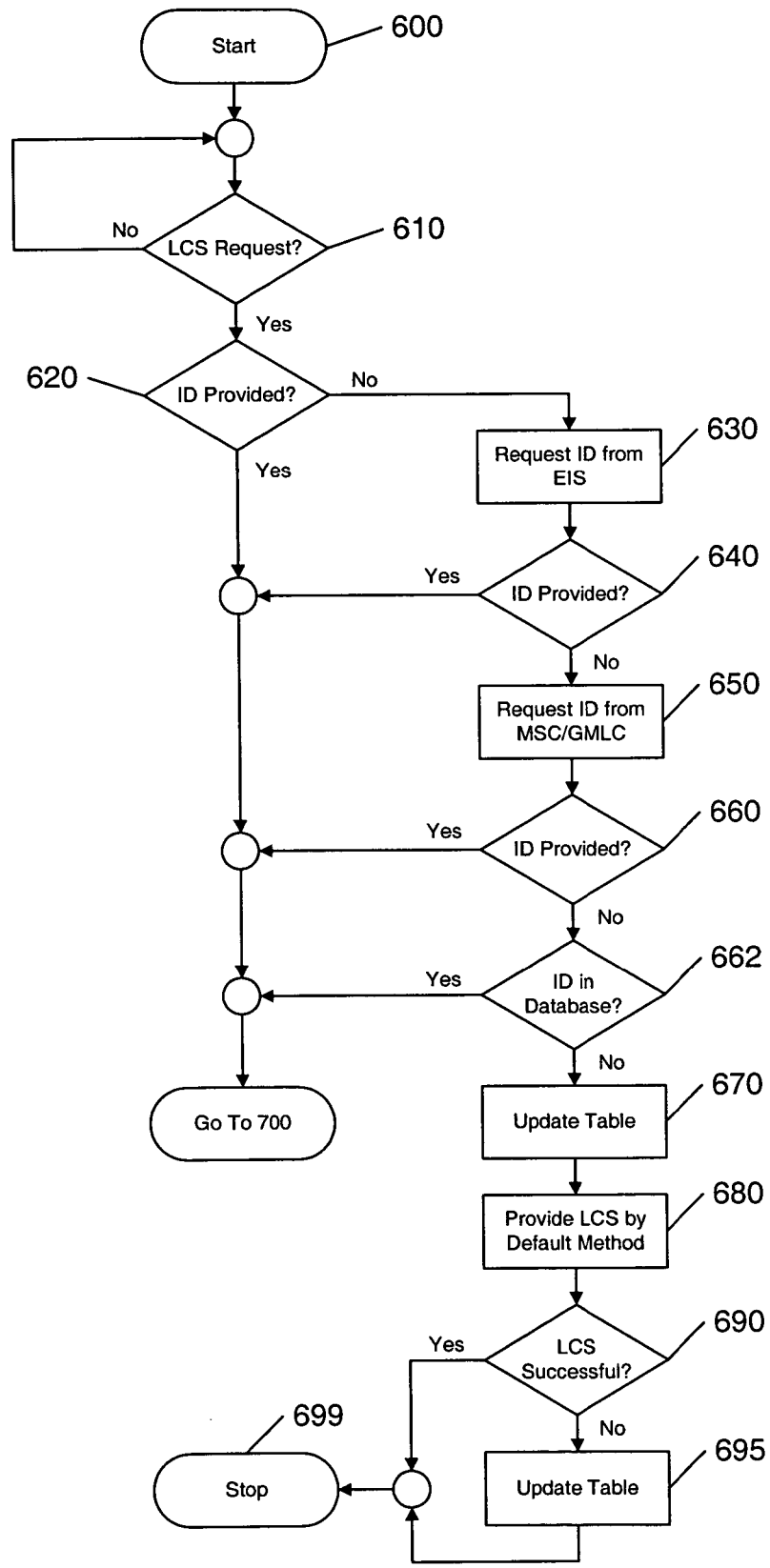
FIG. 6 is a flow chart illustrating an exemplary method of retrieving equipment information.
Figure 7:
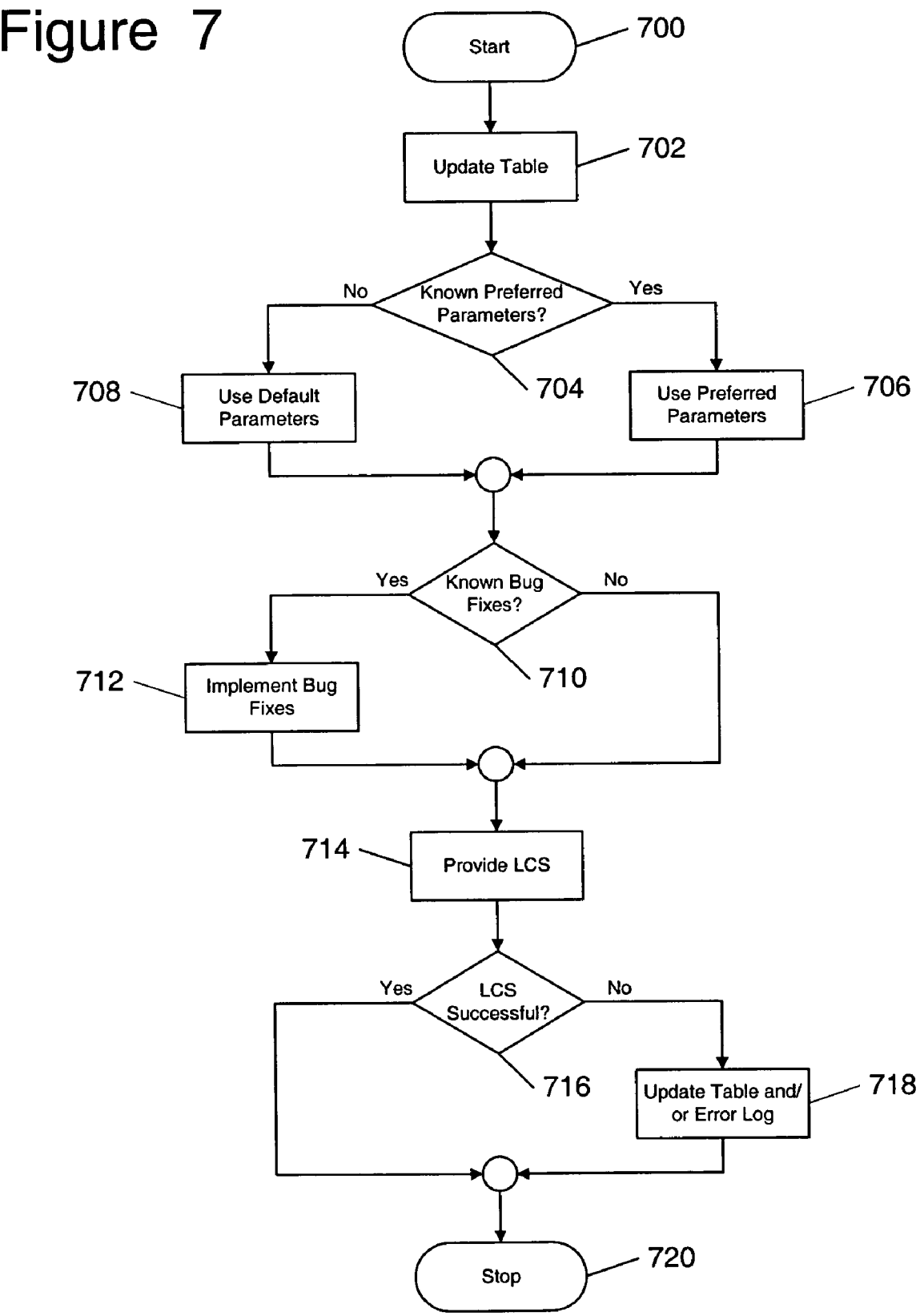
FIG. 7 is a flow chart illustrating an exemplary method of using equipment information to provide location services to a mobile station.

FIG. 6 is a flow chart illustrating the operation of a system, such as the system 400 of FIG. 4, to receive a location services request without knowing whether equipment identity information is included in the request. At a STEP 610, the method determines whether it received a request for location services. If the answer at step 610 is NO, the method returns to STEP 610. Otherwise, the method determines whether the request includes equipment identifying information for the MS which is to receive the requested location services in STEP 620. If the answer at STEP 620 is YES, the method proceeds to STEP 700, for further processing as illustrated in FIG. 7, which is described below.

If the answer at STEP 620 is NO, the method proceeds to a STEP 630, requesting identifying information from an EIS, such as the EIS 480 (FIG. 4). As described above, an EIS may comprise a stand-alone server or it may be incorporated into another part of a communication system, such as an MSC, a GMLC, EIR, or the like. To implement this request, the method may employ user identity information (such as an IMSI or ESN), provided via the location services request. At a STEP 640, the method determines whether equipment identifying information has been provided. If the answer at STEP 640 is YES, the method proceeds to STEP 700 for further processing. If the answer at STEP 640 is NO, the method proceeds to a STEP 650.

At the STEP 650, the method requests identity information from the MSC/GMLC for the MS to which location services are to be provided, and proceeds to a STEP 660. At the STEP 660, the method determines whether equipment identifying information was provided. If the answer at STEP 660 is YES, the method proceeds to STEP 700. If the answer at STEP 660 is NO, the method proceeds to a STEP 662.

At the STEP 662, the method checks a database, such as the database 500 of FIG. 5, to determine if equipment identity information for the MS has previously been entered into the database. For example, the information may have been entered into the database during a previous attempt by the MS to obtain location information services. As described above, the database may include information relating the user identity for the MS to the equipment identity information. If the information is in the database, the system proceeds to the STEP 700. If the information is not in the database, the system proceeds to a STEP 670.

At the STEP 670, the system updates the equipment information database to reflect that no equipment identity information is available for the session and then proceeds to a STEP 680. At the STEP 680, the method generates control signals that cause system to provide the requested location services in a default manner and then proceeds to a STEP 690. At the STEP 690, the method determines whether the request was successfully granted. If the answer at the STEP 690 is YES, the method proceeds to a STEP 699 and stops further processing of the request. If the answer at STEP 690 is NO, the method proceeds to the STEP 695.

At STEP 695 the method updates the equipment information database to reflect the conditions of the request that was not successful. The method may also generate control signals to create an error log. The equipment information database and the error log may be used to generate fixes and/or determine preferred operational parameters for a receiving MS. The method then proceeds to the STEP 699 and terminates processing of the request.

A communication system may be configured to provide equipment identifying information with a request for location services. In such a system, the method illustrated in FIG. 6 may be omitted.

FIG. 7 illustrates the operation of a system that provides location services using equipment identifying information when a request for location services containing equipment identifying information is received. At STEP 700, the method receives a request for location services incorporating equipment identifying information for the MS to which the services are to be provided.

At a STEP 702, the method updates the information in an equipment information database that reflects the equipment identifying information received with the request, and then proceeds to a STEP 704. The step of updating the database may include discarding outdated information. For example, in many systems, an IMEI may be paired with only one IMSI or ESN at a time, and vice-versa. Thus, if such a system receives a request pairing an IMEI with an IMSI or ESN, previous entries pairing the IMEI with a different IMSI or ESN and previous entries paring the IMSI or ESN with a different IMEI may be updated or deleted.

At STEP 704, the method determines whether there are known preferred operational parameters associated with the equipment for which location services are to be provided. If the answer at STEP 704 is YES, the method generates control signals that cause the method to use the preferred parameters when responding to the request for location services in STEP 706, and proceeds to STEP 710. If the answer at STEP 704 is NO, the method generates control signals that cause the method to use default parameters in responding to the request for location services in STEP 708, and then proceeds to a STEP 710.

At the STEP 710, the method determines whether there are known "bug" fixes for the equipment to which the location services are to be provided. If the answer at STEP 710 is YES, the method proceeds to a STEP 712. If the answer at STEP 710 is NO, the method proceeds to a STEP 714. At the STEP 712, the method generates control signals to implement the known bug fixes and proceeds to STEP 714. At STEP 714, the method generates control signals that provide the requested location services and proceeds to a STEP 716. At the STEP 716, the method determines whether the request was successfully granted. If the answer at STEP 716 is YES, the method proceeds to the STEP 720. If the answer is NO, the method proceeds to a STEP 718.

At the STEP 718, the method updates the equipment information database to reflect the conditions of the request that was not successful. The method may also generate control signals that create an error log. The equipment information table and the error log may subsequently be used to generate fixes and/or to determine preferred operational parameters for a receiving MS. The method then proceeds to a STEP 720. At STEP 720, processing of the request for location services is terminated by the method of FIG. 7.

As previously indicated, adequate performance data is not available for all makes and models of MS equipment. An EIP, such as the EIP 416 (in location server 410) of FIG. 4, may maintain a performance database that maps equipment performance data for communication sessions with various devices, such as the MS 440.

Figure 8:
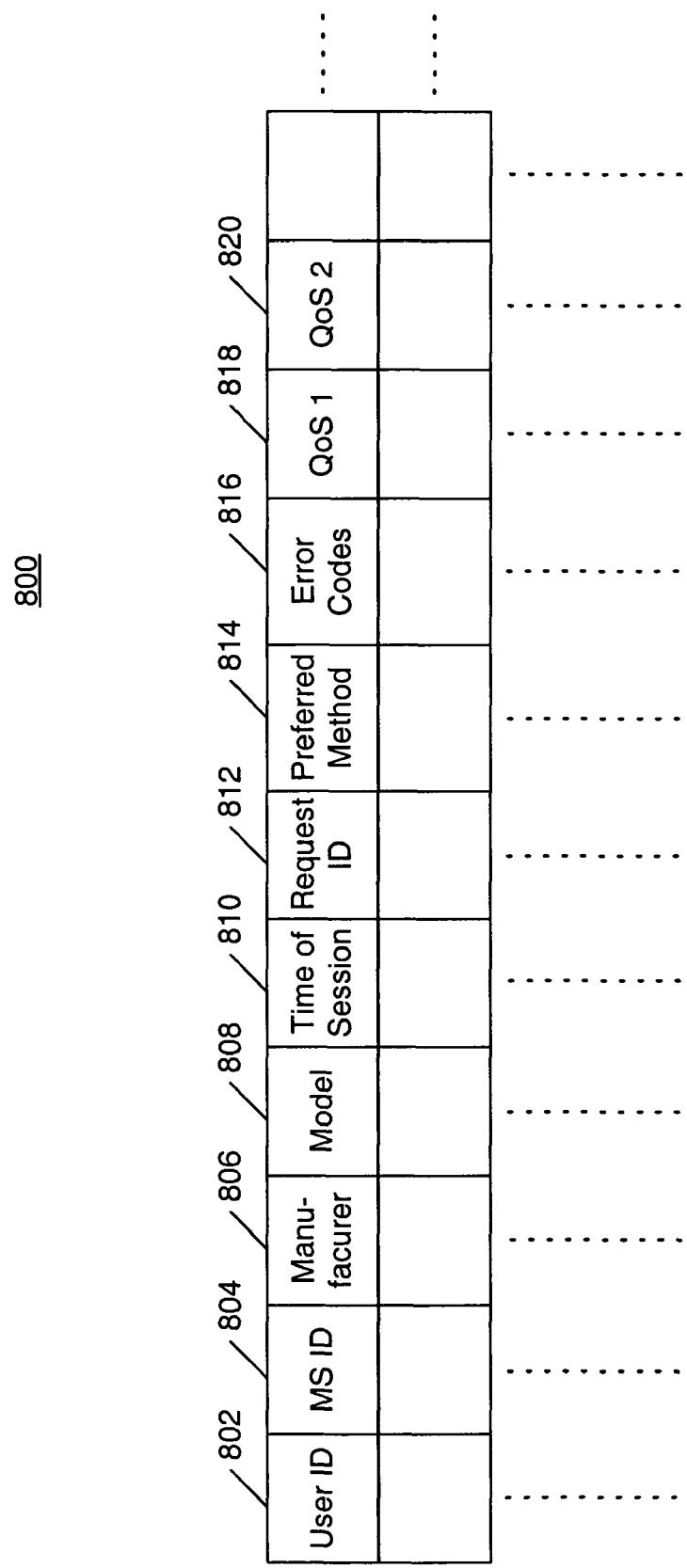
FIG. 8 is another schematic illustration of an exemplary database of equipment information illustrated in tabular form that may be maintained by an embodiment of the wireless communications system, showing additional or alternative elements.

FIG. 8 illustrates an exemplary performance database in the form of a table 800 that may be maintained by an EIP. The database can be used to gather performance data for various makes and models of MS equipment. The table may be conveniently stored in a memory, such as the memory 414 (FIG. 4). The table 800 contains the following fields: a field 802 for storing mobile subscriber identity information, such as an International Mobile Subscriber Identity (IMSI) in a GSM/GPRS or the Electronic Serial Number (ESN) in a WCDMA communication system; a field 804 for storing a mobile equipment identifier (such as an IMEI in a GSM communication system); a field 806 for storing an equipment manufacturer identifier; a field 808 for storing a model identifier; a field 810 for storing the time of the session; a field 812 for identifying the particular request for location services; a field 814 for storing a code identifying a preferred method of providing location services; a field 816 for storing error codes; a field 818 for storing a first quality of service parameter, such as an estimate of the accuracy of a location determination; and a field 820 for storing a second quality of service parameter, such as the time required to prepare a location estimate. Additional fields may be added to the table 800. Not all of the fields shown need to be included in the table 800. Further, the system may employ other database schema.

Figure 9:
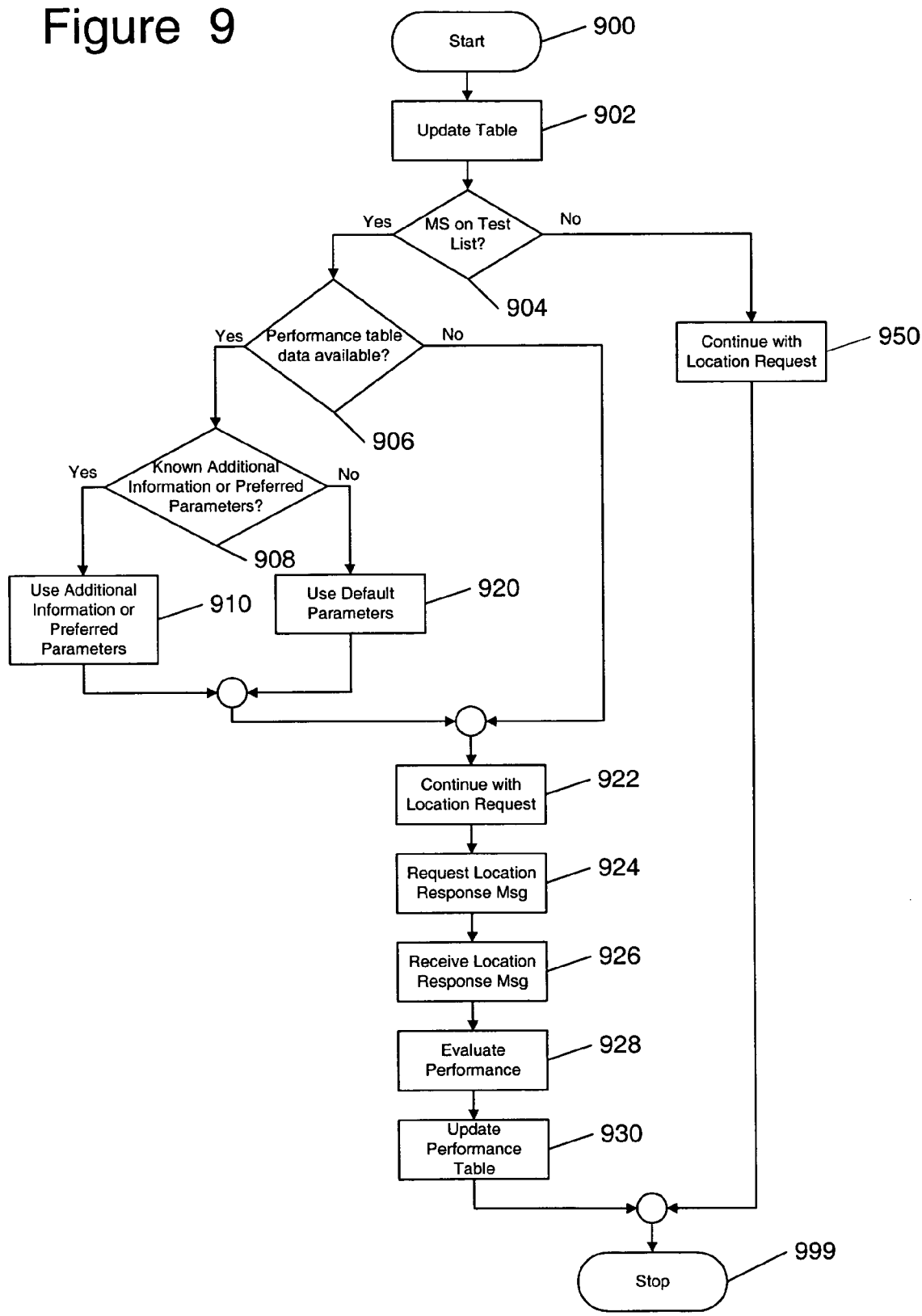
FIG. 9 is a flow chart illustrating an exemplary method of gathering location services performance data for an MS and using performance data table to generate location services control signals relating to Quality of Service for location services.

FIG. 9 is a flow chart illustrating one method of gathering performance data for the MS devices that are provided with location services. At a starting STEP 900, the method receives a request for location services to be provided to an MS device and proceeds to STEP 902.

At STEP 902, the method updates the information in an equipment information database, such as the database illustrated in FIG. 8, to reflect the equipment identifying information received with the request, and proceeds to STEP 904. The act of updating the database may include, for example, the act of discarding outdated information. For example, in many systems, an IMEI may be paired with only one IMSI or ESN at a time, and vice-versa. Thus, if such a system receives a request pairing an IMEI with an IMSI or ESN, previous entries pairing the IMEI with a different IMSI or ESN, and previous entries pairing the IMSI or ESN with a different IMEI, may be updated or deleted.

At STEP 904, the method determines whether performance data are desired for the MS for which location services are to be provided. For example, performance data are recommended for the makes and models of MS devices that did not receive complete standard performance testing. If the answer at STEP 904 is YES, the method proceeds to a STEP 906. If the answer at STEP 904 is NO, the method proceeds to a STEP 950. At the STEP 950 the method proceeds to process the request for location services (see FIG. 7), and subsequently proceeds to the termination STEP 999. At the STEP 906, the method determines whether there is an entry in the performance data table (e.g., the table 800 shown in FIG. 8) for the manufacturer and model of the MS for which location services are to be provided. If the answer at STEP 906 is YES, the method proceeds to a STEP 908. If the answer at the STEP 906 is NO, the method proceeds to a STEP 922.

At the STEP 908, the method determines from the performance data table whether additional information and/or preferred operating parameters are known for the MS to which the location services are to be provided. If the answer at STEP 908 is YES, the method proceeds to a STEP 910. If the answer at STEP 908 is NO, the method proceeds to a STEP 920. At the STEP 910, the method generates control signals that implement known additional information and/or preferred operating parameters and proceeds to a STEP 922. At the STEP 920, the method generates control signals that cause the system to use default operating parameters when responding to the request for location services and proceeds to a STEP 922.

At the STEP 922, the method continues processing the request for location services (see FIG. 7) and proceeds to a STEP 924. At the STEP 924, the method requests a response message from the MS to which location services were provided. One of skill in the wireless communications art will recognize that the STEP 924 may be omitted under certain testing situations. For example, a response may be automatically provided. The method then proceeds to a STEP 926. At the STEP 926, the method receives a response message from the MS to which location services were provided and proceeds to a STEP 928. At the STEP 928, the method evaluates the performance of the MS receiving the location services and proceeds to a STEP 930. At the STEP 930 the method updates a performance table, such as the performance table 800 of FIG. 8, to reflect the performance of the MS, and proceeds to a STEP 999. One of skill in the art will recognize that the performance data may comprise actual performance values. Alternatively, the performance data may comprise data indicating whether a target value was met.

A request to provide location services associated with an MS need not originate with the associated MS. For example, one MS may request the location of a second MS. Alternatively, an MS may be connected to the communication system for other reasons, such as to place a telephone call, and the communication system may recognize that the MS is of a type for which location services performance data is desired. Thus, the communication system may automatically request location services for the MS.

Those of skill in the wireless communications art shall recognize that the steps illustrated in FIGS. 6, 7, and 9 need not occur in the particular order illustrated, and that steps may be omitted, or additional steps may be performed without departing from the scope or spirit of the present invention.

Exemplary Implementation for GSM

Mandatory features and functions for GSM LCS are documented in the incorporated reference 3GPP TS 43.059. However, a concern presently exists that existing MSs are unable to be accurately and fully tested for all of these mandatory features/functions. Particularly in the case of GPS and assisted-GPS (A-GPS) methods, the MS complete conformance tests are not standardized. Hence, when one of the un-tested features or functions is "switched on" in a network, there is a risk that some MSs will not work with the feature/function (or a combination of features/functions). Some solutions in mobile network system for such problems comprise: costly network patches (if at all possible), even more costly mobile updates, or disabling the functionality until it is supported sufficiently by existing MS equipment.

In prior art GSM systems, the IMEI has been employed for correcting coding errors and other faults unrelated to LCS. The MSC obtains IMEI of the target mobile via standard signaling between the MS and the MSC. However, the prior art methods cannot be employed for LCS because the IMEI is not available to the location determination network entity, which may be either mobile device or location server. The current inventive concept (as described hereinabove) advantageously overcomes the limitations of the prior art solutions. In one aspect, the location service request from the GMLC to the MSC may carry IMEI information to the MSC. The MSC may then transmit the complete IMEI message, or simply transmit the MS manufacturer and model information, to the location server and/or EIP. This information may be transmitted as an element in the standard location request message, or alternatively via a proprietary message between the MSC and the location server using the radio access network. If the GSM network cannot provide the MS identity information to the location server using a standard or proprietary message, data tables may then be maintained in the location server and/or the EIP and/or the MS, as described previously. These data tables may employ the IMSI or ESN (which may be obtained for each call by an MS), and may be adapted to relate the IMSI or ESN to the MS manufacturer/model, faults, and performance data.

In one exemplary application of the present inventive concept, an MS may not function correctly, and hence the required location QoS (e.g. location accuracy) of location service cannot be confirmed. The location service has a wide range of applications based on QoS. For example, one application based on QoS comprises pinpointing an emergency user within a few meters. Another application comprises locating nearby restaurants in the vicinity of a few kilometers. Failure to pinpoint emergency users may cause injury to users, whereas failure to provide QoS to subscribers may cause revenue loss to operators. An exemplary implementation of the performance method described in reference to FIG. 9 relates to the problem of providing and confirming a required location QoS. If a location request specifies a location QoS (e.g., an MS location accuracy required to be within 50 meters), this cannot be achieved by default operating parameters and control signals. The inventive method may be used to improve the location accuracy to a required level by retrieving known additional information or operating parameters from the performance database and implementing control signals responsive to this data. For example, if a fault exists in implementing assisted-GPS in a particular MS, the method may employ an Enhanced Observed Time Difference (E-OTD) positioning method instead. Further, depending on the required QoS, the system may recruit fewer or greater numbers of BTS pairs for the E-OTD position determination.

Thus, persons skilled in the wireless communication arts shall understand that the present inventive concept as described hereinabove advantageously addresses problems relating to MS equipment capabilities by determining whether a particular MS supports the required service, and if not, optionally providing control signals or additional information that improve the LCS response.

Another Embodiment

Figure 10:
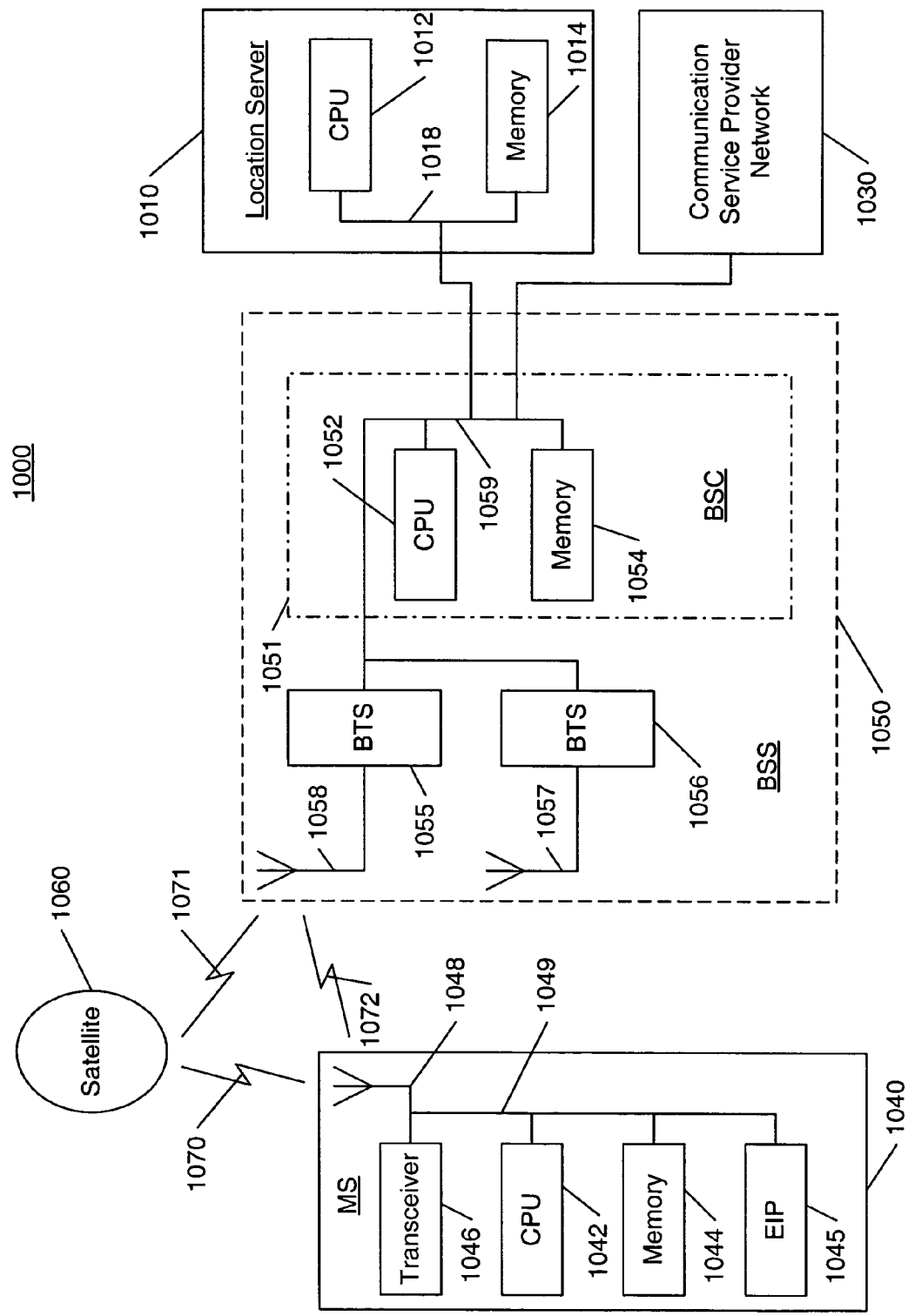
FIG. 10 is another functional block diagram of a wireless communication system for providing wireless communications including location services, showing a mobile station having an equipment identity processor.

Another aspect of the present inventive concept is illustrated in FIG. 10, which depicts a simplified communication system 1000 in functional block form. The system 1000 of FIG. 10 is similar to the system 200 of FIG. 2. However, in this exemplary embodiment of the inventive concept, an MS 1040 includes an EIP 1045. Further, the MS 1040 is enabled for MS-assisted or MS-based location determination. As defined in the incorporated reference 3GPP TS 43.059, MS-assisted positioning is a mobile centric positioning method (e.g. E-OTD, A-GPS) in which the MS provides position measurements to the network for computation of a location estimate provided by the network. The network may provide assistance data to the MS that enables location measurements and/or improve measurement performance. MS based positioning is defined as any mobile centric positioning method (e.g. E-OTD, A-GPS) in which the MS performs both position measurements and computation of a location estimate and wherein assistance data useful or essential to one or both of these functions is provided to the MS by the network.

As described in more detail below, the MS 1040 is enabled in this embodiment to determine equipment identity information relating to the manufacturer and model of a location server 1010. The MS 1040 uses this information to select a preferred set of messages and parameters for exchanging data with the location server 1010. If the location server 1010 is known to have "bugs", the MS 1040 optionally may employ data signals to avoid triggering the bugs. Further, when responding to location information requests, the MS 1040 may include a capability that learns about the features and bugs of a particular location server. The MS may store the information obtained by the MS for future use.

As shown in FIG. 10, the MS 1040 includes a CPU 1042, a memory 1044 and a transceiver 1046. The transceiver 1046 allows the transmission and reception of data, such as audio/video/text communication and programming data, between the MS 1040 and a remote location, such as the BSS 1050 or the satellite 1060. An antenna 1048 is electrically coupled to the transceiver 1046. Typically, the CPU 1042 implements the EIP 1045 by executing a specific set of instructions stored in the memory 1044, although in some embodiments a separate dedicated processor may be used to implement the EIP 1045. The CPU 1042 may execute instructions stored in the memory 1044. The components of the MS 1040 are linked together by a bus system 1049.

The BSS 1050 includes a BSC 1051 having a CPU 1052, a memory 1054, and BTSs 1055 and 1056. The BTSs allow transmission and reception of data (such as audio/video/text communication and programming data) between the BSS 1050 and a remote location (such as the MS 1040 or the satellite 1060). Antennas 1057 and 1058 are electrically coupled to the BTSs. The BSC 1051 includes a bus system 1059. The location server 1010, the MS 1040, the BSS 1050 and the satellite 1060 communicate using communication links 1070, 1071, and 1072. As previously noted, the communication link 1071 is optional, since other means for receiving the satellite data (e.g., a Wide Area Reference Network, not shown) may be employed. Although one satellite is illustrated by way of example, persons skilled in the communications arts shall recognize that a plurality of satellites may be employed to provide LCS to the MS, or none. The system 1000 includes a location server 1010 that has a memory 1014 and a CPU 1012 that controls operation of the location server 1010. The memory 1014 provides instructions and data to the CPU 1012 in a known matter.

The components of the location server 1010 are linked together by a bus system 1018. As noted above in reference to previous figures, although the location server 1010 is illustrated as external to the BSS 1050, it may be incorporated within the BSS 1050 or the BSC 1051, or it may be located within the communication service provider network 1030, or in some combination thereof.

The EIP 1045 may maintain a database, for example a relational database, that maps equipment information (for example, unique equipment identifiers such as Location Area Identifiers and Operator IDs) for communication sessions with various BSSs, such as the BSS 1050. The database may conveniently be stored in the memory 1044. The database may be updated for every request for location services received or initiated by the MS 1040, or it may be updated for only some requests, for example, to make a meaningful statistical sampling. It may also be updated to delete obsolete information.

Figure 11:
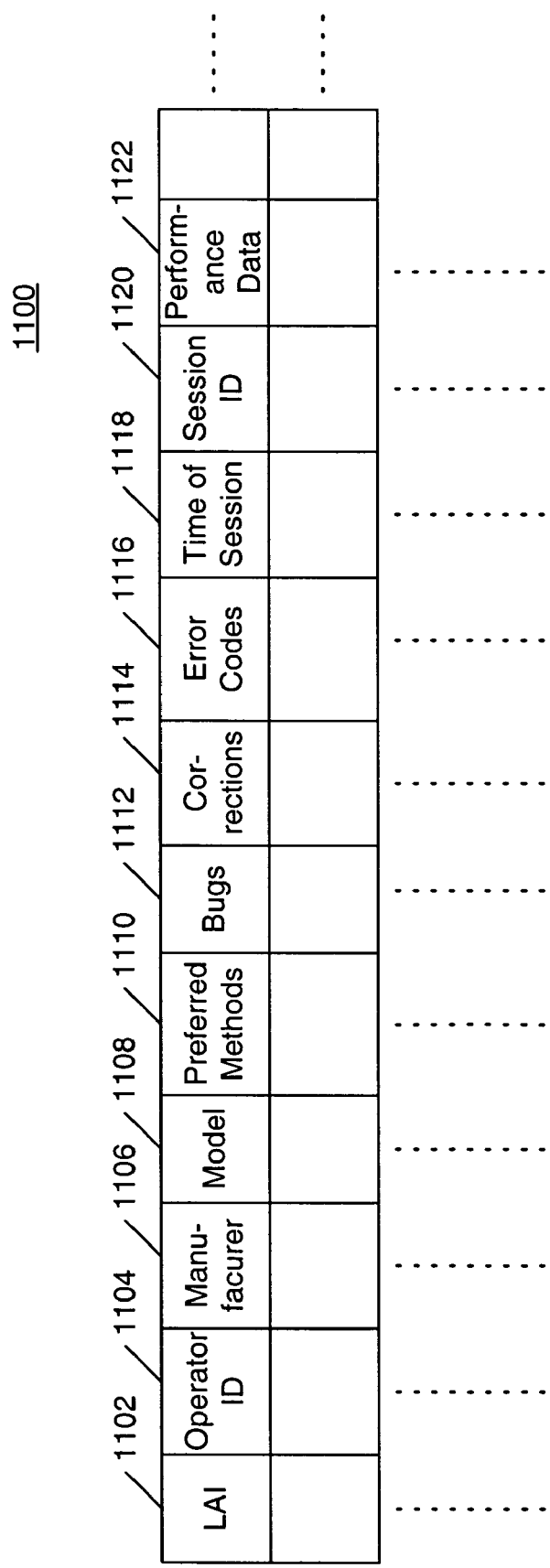
FIG. 11 is an exemplary database in the form of a table that may be maintained by an equipment identity processor incorporated in a mobile station.

FIG. 11 illustrates an exemplary database in the form of a table 1100 that may be maintained by an EIP incorporated in an MS. As shown in FIG. 11, the table 1100 contains the following fields: a field 1102 for storing identity information relating to the geographical service area, such as the Location Area Identifier (LAI); a field 1104 for storing a service provider identifier such as an Operator ID; a field 1106 for storing a location server equipment manufacturer identifier; a field 1108 for storing a location server model identifier; a field 1010 for storing a code identifying a preferred method of providing location services; a field 1112 for storing known bug codes associated with the particular manufacturer and or model; a field 1114 for storing correction codes; a field 1116 for storing error codes; a field 1118 for storing a time of session; a field 1120 for storing a session ID relating to a location request; and a field 1122 for storing performance data. As noted above, by reading the Location Area Identifier (LAI), which is transmitted on the common channels, the MS can determine, using database information, which model of position location server is used in that particular network. Similarly, the MS can also determine the Operator Identification (ID) based upon broadcast information. The Operator ID can be related through database information to the position location server equipment. Table 1100 may contain additional fields and may refer to other databases or tables, or it may not contain all of the fields described herein and shown in FIG. 11. For example, a separate database, containing the bug codes and corresponding correction codes, may exist. In this embodiment, table 1100 may contain a field 1112 for storing the bug code. In operation, the MS 1040 would look up the corresponding correction code in another database or table, rather than storing it in the field 1114.

Figure 12:
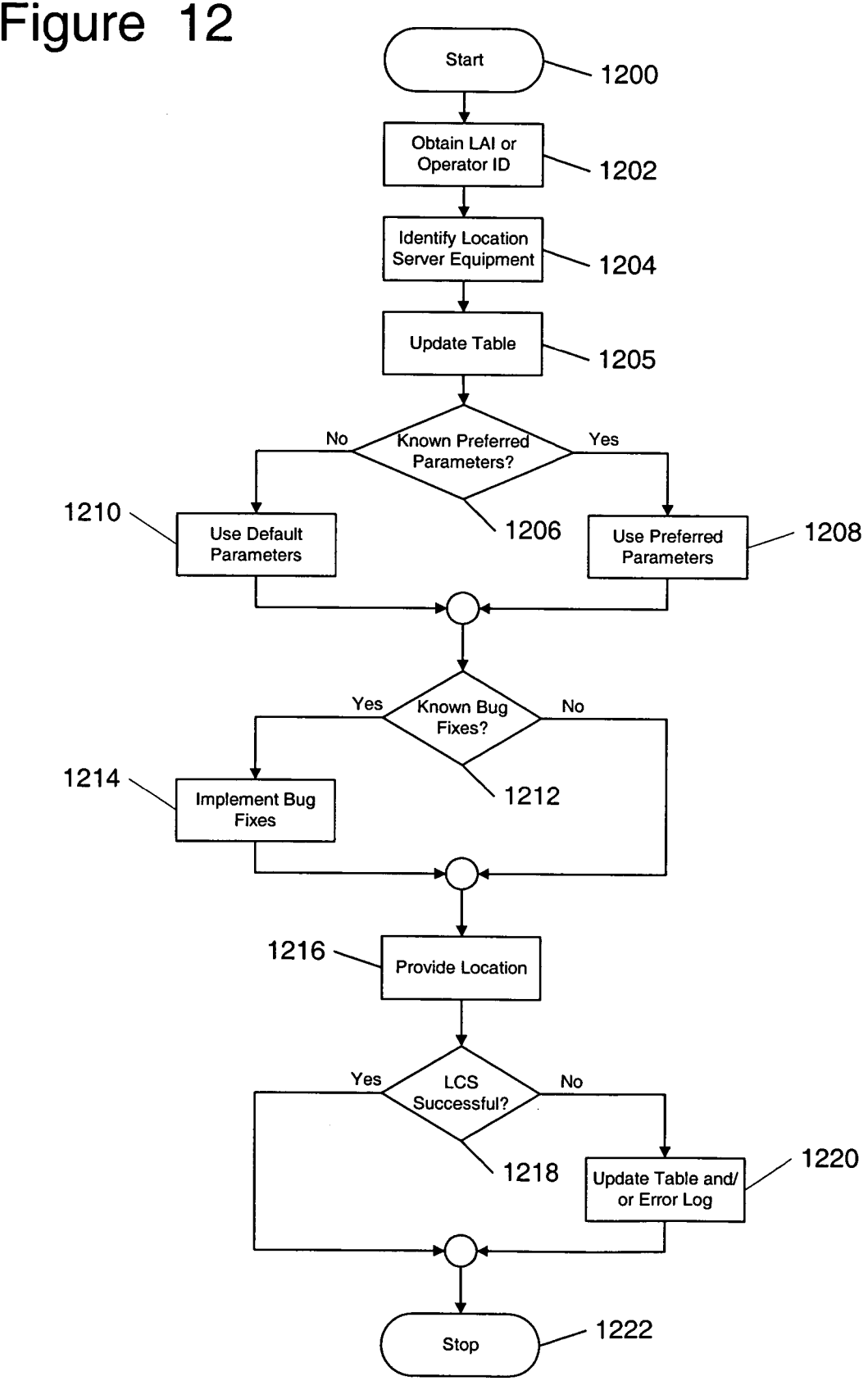
FIG. 12 is a flowchart illustrating an exemplary method for providing location services, using a mobile station having an equipment identity processor.

FIG. 12 illustrates the operation of a method that provides location services using an MS such as the MS 1040 (having an EIP such as the EIP 1045 and enabled for MS-assisted or MS-based positioning). At STEP 1200, a request for location services is received by the MS and processing commences. At STEP 1202, the MS obtains the LAI or operator ID, and the method proceeds to a STEP 1204. The LAI or operator ID may be obtained by receiving this information from the common broadcast channels. Alternatively, if the LAI and/or operator ID are known from previous communication sessions, and have not changed, these identifiers may retrieved from the MS memory. For example, these data may have been previously stored in a database or table such as table 1100. At the STEP 1204, the EIP retrieves location server equipment identity information from a database or data table, such as the table 1100, and the method proceeds to a STEP 1205. At the STEP 1205, the database or table is updated. For example, the time of session and session ID may be entered in association with the LAI, etc. Entry of such data may facilitate future retrieval and use of equipment identity information as noted above. Proceeding to the STEP 1206, the EIP determines whether there are known preferred operational parameters associated with the location server equipment employed by the network operator. If the answer at STEP 1206 is YES, the MS generates control signals that cause the method to use the preferred parameters when responding to the request for location services in the STEP 1208. The method then proceeds to a STEP 1212.

If the answer at the STEP 1206 is NO, the MS generates control signals that cause the method to use default parameters when responding to the request for location services at STEP 1210. The method then proceeds to a STEP 1212.

At the STEP 1212, the EIP determines whether there are known bug fixes for the location server equipment. If the answer at STEP 1212 is YES, the method then proceeds to a STEP 1214. If the answer at STEP 1212 is NO, the method the proceeds to a STEP 1216. At the STEP 1214, the MS generates control signals that implement the known bug fixes and the method proceeds to a STEP 1216. At the STEP 1216, the MS generates control signals that provide the requested location services. The method then proceeds to a STEP 1218. At the STEP 1218, the MS determines whether the request was successfully granted. If the answer at STEP 1218 is YES, the method proceeds to a STEP 1222. If the answer is NO, the method proceeds to a STEP 1220.

At the STEP 1220, the EIP updates the equipment information database or data table to reflect that the request was unsuccessful. The EIP may also generate control signals that create an error log. The equipment information table and the error log may subsequently be used to generate fixes and/or determine preferred operational parameters for subsequent location requests. By this means, the MS can generate information about features and bugs of a particular location server and store this information for future use. The method then proceeds to a STEP 1222 whereat processing by the MS is terminated.

Figure 13:
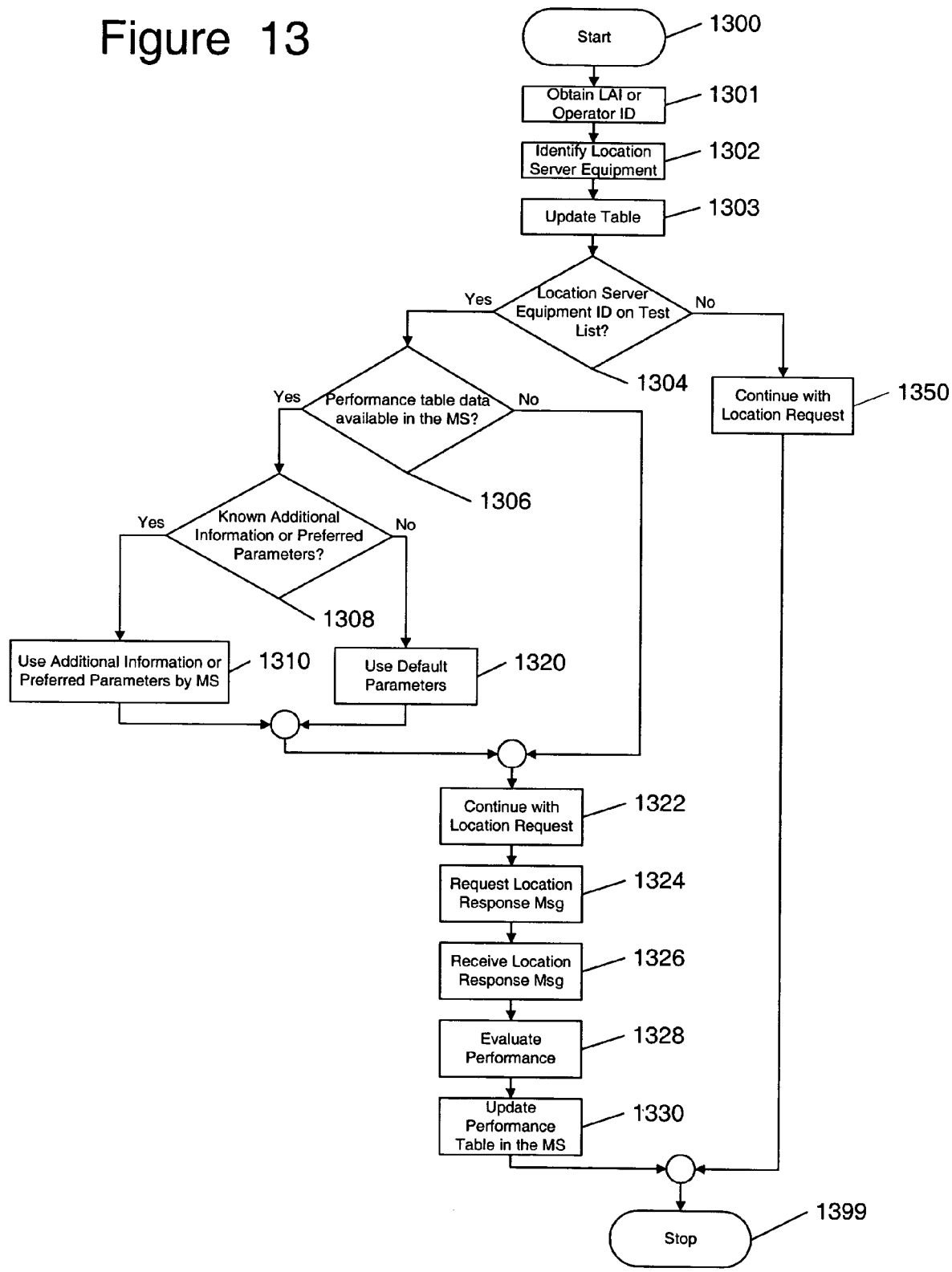
FIG. 13 is flowchart illustrating another exemplary method for providing location services using a mobile station having an equipment identity processor, wherein performance data are stored and retrieved.

FIG. 13 is a flow chart illustrating one exemplary method of gathering performance data by an MS device relating to location server equipment. At a starting STEP 300, the method receives a request for location information to be provided by an MS device to a location server, and proceeds to STEP 1301. At step 1301, the MS obtains the LAI or operator ID by reading the content of signaling messages transmitted by the BTS in the area where the MS is operating, and the method proceeds to a STEP 1302. At the STEP 1302, the EIP retrieves location server equipment identity information from a database or data table, such as the table 1100 described above, and the method proceeds to a STEP 1303.

At the STEP 1303, the method updates the information in an equipment information database, such as the database illustrated in FIG. 11, to reflect the equipment location server identifying information, session ID, time of session, etc., and proceeds to a STEP 1304.

At the STEP 1304, the method determines whether performance data are desired for the location server equipment. For example, performance data are recommended for location server equipment that has not been thoroughly tested in conjunction with the MS. If the answer at STEP 1304 is YES, the method proceeds to a STEP 1306. If the answer at STEP 1304 is NO, the method proceeds to a STEP 1350. At the STEP 1350 the method proceeds to process the request for location services (see FIG. 12), and subsequently proceeds to the termination STEP 1399. At the STEP 1306, the method determines whether there is an entry in the performance data table (e.g., the table 1100 shown in FIG. 11) for the manufacturer and model of the location server to which location information is to be provided. If the answer at STEP 1306 is YES, the method proceeds to a STEP 1308. If the answer at the STEP 1306 is NO, the method proceeds to a STEP 1322.

At the STEP 1308, the method determines from the performance data table whether additional information and/or preferred operating parameters are known for the location server equipment to which the location data are to be provided. If the answer at STEP 1308 is YES, the method proceeds to a STEP 1310. If the answer at STEP 1308 is NO, the method proceeds to a STEP 1320. At the STEP 1310, the method generates control signals that implement known additional information and/or preferred operating parameters and proceeds to a STEP 1322. At the STEP 1320, the method generates control signals that cause the system to use default operating parameters when responding to the request for location services and proceeds to a STEP 1322.

At the STEP 1322, the method continues processing the request for location services (see FIG. 12) and proceeds to a STEP 1324. At the STEP 1324, the method requests a response message from the location server equipment to which the location data were provided. One of skill in the wireless communications art will recognize that the STEP 1324 may be omitted under certain testing situations. For example, a response may be automatically provided. The method then proceeds to a STEP 1326. At the STEP 1326, the method receives a response message from the location server equipment to which location data were provided and proceeds to a STEP 1328. At the STEP 1328, the method evaluates the performance of the location server equipment receiving the location data and proceeds to a STEP 1330. At the STEP 1330 the method updates a performance table, such as the performance table 1100 of FIG. 11, to reflect the performance of the location server equipment, and proceeds to a STEP 1399. One of skill in the art will recognize that the performance data may comprise actual performance values. Alternatively, the performance data may comprise data indicating whether a target value was met.

Those of ordinary skill in the communications and computer arts shall also recognize that computer readable medium which tangibly embodies the method steps of any of the embodiments herein may be used in accordance with the present teachings. For example, the method steps described above with reference to FIGS. 6, 7, 9, 12 and 13 may be embodied as a series of computer executable instructions stored on a the computer readable medium. Such a medium may include, without limitation, RAM, ROM, EPROM, EEPROM, floppy disk, hard disk, CD-ROM, etc. The disclosure also contemplates the method steps of any of the foregoing embodiments synthesized as digital logic in an integrated circuit, such as a Field Programmable Gate Array, or Programmable Logic Array, or other integrated circuits that can be fabricated or modified to embody computer program instructions.

A number of embodiments of the present invention have been described. Nevertheless, it will be understood that various modifications may be made without departing from the scope of the invention. For example, the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order, except for those embodiments described in a claim that include a specified order for the steps.

Accordingly, it is to be understood that the invention is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. A location services apparatus for providing location services to a mobile station, comprising:
 a) a CPU;
 b) a memory coupled to the CPU, wherein the memory stores data comprising location services equipment identity information and a plurality of location services equipment identifiers; and
 c) an equipment identity processor coupled to the CPU and to the memory, wherein the equipment identity processor is configured to receive a location services equipment identifier of the plurality, to receive information identifying an error related to a request for location services from a mobile station identified by the received location services equipment identifier, to retrieve information comprising a location services equipment identity corresponding to the identifier, and to store and retrieve data related to errors associated with the location services equipment identity, and wherein the equipment identity processor selectively generates location services control signals that control operation of the CPU responsive to the identified location services equipment identity.

2. The location services apparatus of claim 1 wherein the location services equipment identity information and the plurality of location services equipment identifiers are associated with and correspond to a mobile station.

3. The location services apparatus of claim 2 wherein the equipment identity processor stores the data related to errors by generating location services control signals causing the CPU to store the data related to errors in the memory.

4. The location services apparatus of claim 1, further comprising an equipment identity server, wherein the equipment identity server is configured to provide the data related to errors to the equipment identity processor.

5. The location services apparatus of claim 1 wherein the the data related to errors includes an error code associated with the mobile station.

6. The location services apparatus of claim 5 wherein the location services control signals compensate for an error associated with the error code.

7. A communication system for providing location services to a mobile station, the system comprising:
 a) a base station system; and
 b) a location server coupled with the base station system, wherein the location server is configured to receive a request for location services associated with the mobile station, to identify a mobile station type of the mobile station, to identify an error associated with the request for location services, to store and retrieve data relating to errors associated with the identified mobile station type, and to selectively generate location services control signals to control operation of the system to correct the identified error based at least in part on the retrieved data relating to errors associated with the identified mobile station type.

8. A method of providing location services to a mobile station, the method comprising the steps of:
 a) receiving a request for location services to be provided to the mobile station;
 b) identifying an error associated with the request;
 c) retrieving data relating to errors associated with an identified mobile station type for the mobile station;
 d) selectively generating location services control signals based at least in part on error identified in step b) and the retrieved data of step c); and
 e) storing data on the generated location services control signals.

9. The method of claim 8, further comprising the step of storing data based at least in part on the identified error.

10. The method of claim 8 wherein the location services control signals compensate for an error associated with a bug.

11. The method of claim 8 wherein the location services control signals compensate for an error associated with an error code.

12. A communication system comprising:
 a) a means for providing location services to a mobile station;
 b) a means for identifying an error associated with a request to provide location services to the mobile station;
 c) a means for storing and retrieving data relating to errors associated with an identified mobile station type for the mobile station; and
 d) a means for controlling the means for providing location services to correct the identified error based at least in part on retrieved data relating to the errors associated with the identified mobile station type.

13. The communication system of claim 12, further comprising a means for identifying a mobile station to which location services are to be provided.

14. The communication system of claim 12, further comprising a means for storing data related to corrective action of step d).

15. A method of operating a location server, comprising the steps of:
 a) receiving a request for location services associated with a mobile station;
 b) identifying a mobile station type of the associated mobile station;
 c) identifying an error related to the request; and
 d) storing the identified mobile station type and the identified error.

16. The method of claim 15 wherein receiving a request for location services associated with a mobile station includes receiving a mobile station type identifier.

17. The method of claim 15 wherein receiving a request for location services associated with a mobile station includes receiving a mobile station manufacturer identifier and a mobile station model identifier as part of the request for location services.

18. The method of claim 15 wherein receiving a request for location services associated with a mobile station includes receiving a mobile station user identifier.

19. The method of claim 18, wherein the mobile station user identifier may include an international mobile subscriber identity or an electronic serial number.

20. The method of claim 18, wherein the mobile station user identifier may include an international mobile subscriber identity or an electronic serial number.

21. The method of claim 15 wherein identifying a mobile station type of the associated mobile station includes identifying the associated mobile station by manufacturer and model.

22. The method of claim 15, further comprising the step of retrieving data relating to errors associated with the identified mobile station type.

23. A method of operating a location server, comprising:
 a) receiving a request for location services associated with a mobile station;
 b) identifying a mobile station type of the associated mobile station;
 c) determining whether an error related to the request for location services has occurred; and
 d) storing and retrieving data relating to errors based on the identified mobile station type.

24. A method of operating a location server, comprising:
 a) receiving a request for location services associated with a mobile station;
 b) identifying a mobile station type of the associated mobile station;
 c) determining an error has occurred related to the request for location services; and
 d) storing and retrieving data associated with and corresponding to the error in a database of corrective actions.

25. The method of claim 24, further comprising the step of providing location services using location services control signals based at least in part on data retrieved from the database of corrective actions.

26. A method of operating a location server, comprising:
 a) receiving a plurality of requests for location services associated with a plurality of requesting mobile stations;
 b) for at least some of the received requests, identifying a mobile station type of the associated mobile station;
 c) identifying errors related to at least some of the received requests for location services; and
 d) maintaining a database of corrective actions based at least in part on the identified errors and the identified mobile station type.

27. A method of operating a location server, comprising:
 a) receiving a plurality of requests for location services associated with a plurality of requesting mobile stations;
 b) for at least some of the requests for location services, identifying a mobile station type;
 c) for at least some of the identified mobile station types, receiving information on errors associated with the at least some of the requests; and
 d) storing and retrieving data associated with and corresponding to the errors based on the identified mobile station type.

28. A method of operating a communication system, comprising:
 a) communicating with a plurality of mobile stations;
 b) for at least some of the mobile stations, determining a corresponding mobile station type;
 c) for at least some of the corresponding mobile station types, initiating a request for location services for the corresponding mobile stations;
 d) identifying one or more errors associated with received requests for location services from at least a subset of the plurality of mobile stations; and
 e) storing and retrieving data relating to the identified one or more errors based on at least one of the corresponding mobile station types.

29. The method of claim 28, further comprising providing the requested location services.

* * * * *

UNITED STATES PATENT AND TRADEMARK OFFICE
CERTIFICATE OF CORRECTION

PATENT NO. : 7,319,876 B2
APPLICATION NO. : 10/648623
DATED : January 15, 2008
INVENTOR(S) : Anjali Jha and Francesco Grilli Page 1 of 1

It is certified that error appears in the above-identified patent and that said Letters Patent is hereby corrected as shown below:

On the Title Page, Item (73) should read,
--(73)  QUALCOMM Incorporated, San Diego, CA, (US)--

Column 18, line 64, "errors associated", should be replaced with, --the errors associated--

Column 19, line 47, "whether", should be replaced with, --that--

Signed and Sealed this

Third Day of August, 2010

David J. Kappos
*Director of the United States Patent and Trademark Office*